Figure 1:
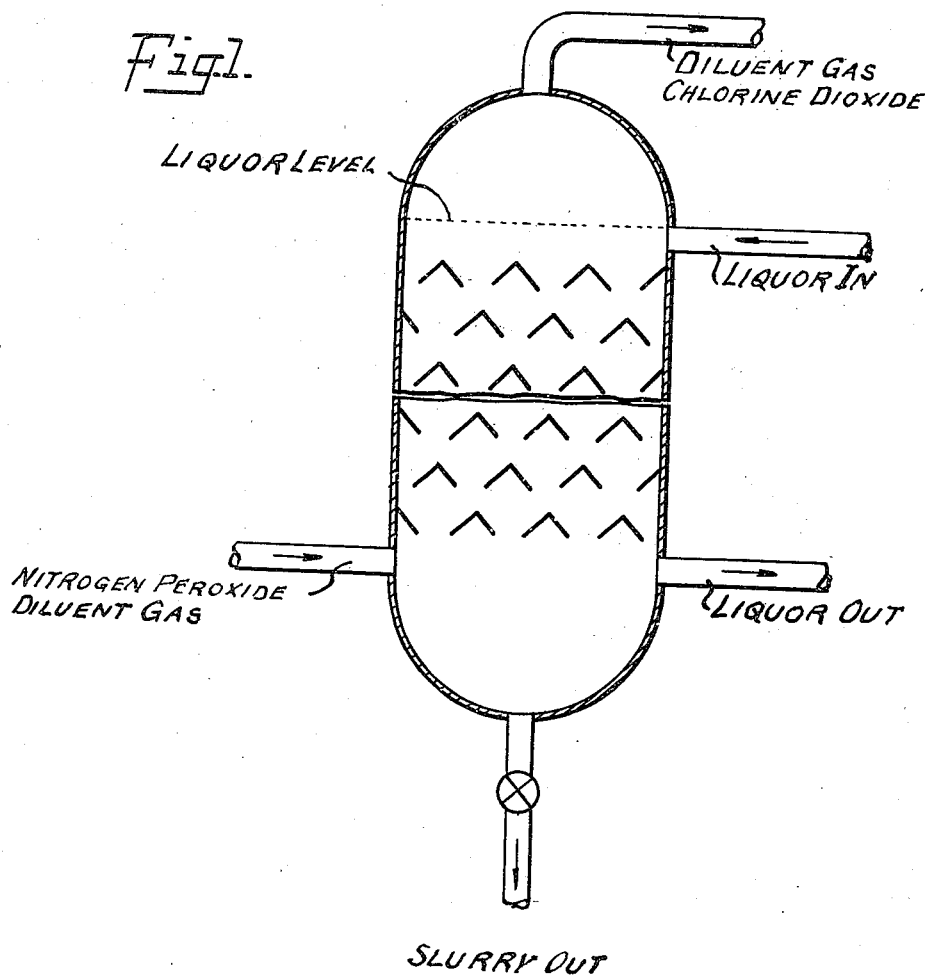

Oct. 19, 1948.  J. F. HALLER  2,451,826
PROCESS FOR MAKING CHLORINE DIOXIDE
Filed March 17, 1948

INVENTOR
JOHN F. HALLER
BY
Pennie, Edmonds, Morton & Barrows
ATTORNEYS

UNITED STATES PATENT OFFICE 2,451,826

PROCESS FOR MAKING CHLORINE DIOXIDE

John F. Haller, Niagara Falls, N. Y., assignor to Mathieson Chemical Corporation, a corporation of Virginia Application March 17, 1948, Serial No. 15,450

7 Claims. (Cl. 23—152)

My invention relates to the generation of chlorine dioxide. My invention provides a process for generating chlorine dioxide which is economically advantageous, particularly where chlorine dioxide substantially free from chlorine is required. Essentially, the process of my invention consists in reacting nitrogen peroxide, usually in admixture with an inert diluent gas, with a solution of chloric acid in aqueous nitric acid.

Gas mixtures comprising chlorine dioxide and chlorine can be generated in several ways with reasonable economy. For many purposes, such gas mixtures are quite satisfactory. For others, the chlorine contamination is undesirable. For example, economical production of chlorites requires chlorine dioxide, or a gas mixture comprising chlorine dioxide, substantially free from chlorine. Chlorine can be separated from chlorine dioxide, or gas mixtures comprising chlorine dioxide, but not without impairing the economy of the overall operation. Batch generation operations tend to produce a gas mixture in which the chlorine concentration increases as the individual operation progresses, making it necessary to reject substantial quantities of reactants to maintain a maximum limit on chlorine concentration substantially less than that characteristic of the final stages of operation. Continuous operations have hitherto been characterized by the production of gas mixtures comprising at best minor but substantial concentrations of chlorine. In referring to chlorine dioxide or gas mixtures comprising chlorine dioxide as "substantially free from chlorine," I refer to such gas or gas mixtures containing not more than 2% by volume of chlorine.

In practicing my invention, dry nitrogen peroxide is reacted with a solution of chloric acid in aqueous nitric acid containing not less than 35% by weight $HNO_3$ on the total of water and nitric acid. The nitrogen peroxide should be dry since, if water vapor is present, some decomposition with the formation of nitric acid and nitric oxide occurs and the latter reacts with chloric acid to form chlorine which then appears as a contaminant of the chlorine dioxide. The aqueous nitric acid solution of chloric acid should contain not less than 35% by weight $HNO_3$ on the total of water and nitric acid. The $HNO_3$ concentration of the solution may be as high as 72% by weight on the total of water and nitric acid or higher, but as the $HNO_3$ concentration of the solution increases, the solubility of chlorates dissolved in the solution to form the chloric acid, decreases. $HNO_3$ concentrations approximating 35%–45% by weight on the total of water and nitric acid are particularly advantageous. The solubility of the chlorate, in which form the chloric acid is supplied, is in general so much higher at lower $HNO_3$ concentrations, 156 grams of sodium chlorate in 72% $HNO_3$ as compared to 417 grams of sodium chlorate in 35% $HNO_3$ at 30° C., for example, that production rates, with the same apparatus, are higher with solutions of lower $HNO_3$ concentrations. However, with $HNO_3$ concentrations lower than 35% by weight, hydrolysis of the nitrogen peroxide with formation of nitric oxide occurs which again results in chlorine contamination of the chlorine dioxide. Although the reaction corresponds in general to the following equation:

$$ClO_3^- + NO_2 \rightarrow NO_3^- + ClO_2$$

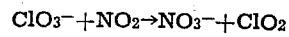

the chloric acid is generated in situ, being supplied as a chlorate, an alkali metal or alkaline earth metal chlorate for example, which is dissolved in the aqueous nitric acid forming chloric acid and the corresponding nitrate. The relative solubilities of sodium chlorate and sodium nitrate, as well as considerations of cost and availability, make sodium chlorate an advantageous chlorate for this purpose. Lithium chlorate, however, is particularly advantageous in that it is more soluble in the aqueous nitric acid than sodium chlorate whereas lithium nitrate is less soluble than sodium nitrate and the lithium component may be used cyclically. Other chlorates, calcium chlorate or potassium chlorate for example, may be used. Concentrations of chlorate in the aqueous nitric acid up to saturation are useful and the volumetric efficiency of the apparatus used increases with this concentration. Temperatures up to 50° C. are useful. Above this limit, chlorine contamination of the chlorine dioxide becomes substantial. Lower temperatures may be used, but in general a temperature of 15°–35° C. is advantageous. If effective contact between the reactants is maintained, the reaction time required is short. At 30° C., a reaction time of 1 second is usually sufficient; shorter or longer time may be required with higher or lower temperatures, respectively. The chlorine dioxide is with advantage stripped from the solution in which the reaction is effected by passing an inert diluent gas through the solution and the nitrogen peroxide is with advantage supplied to the reaction in admixture with this diluent gas. The diluent gas should be dry and inert with respect to nitrogen peroxide, chlorine dioxide, nitric acid, chloric acid and chlorates. Appropriate inert diluents include air, nitrogen, carbon dioxide, and the like. The proportion of diluent gas used may be such for example that it constitutes approximately 85%–90% by volume of the nitrogen peroxide gas mixture delivered to, and the chlorine dioxide gas mixture recovered from, the contact apparatus. The proportion of diluent gas used is usually determined by the concentration of chlorine dioxide desired in the recovered chlorine dioxide gas mixture. A packed tower or other gas and liquid contact apparatus constructed of material resistant to the reactants is used as a reaction vessel.

The nitrate corresponding to the chlorate used is formed in quantity corresponding to the chlorate consumed and precipitates as it accumulates in excess of its solubility in the reaction mixture. In countercurrent contact apparatus, the precipitated nitrate flows with the liquid as a slurry which with advantage is circulated through a saturator, in which it is resaturated with chlorate, a separator, a filter or a centrifuge for example, from which the precipitated nitrate is recovered, and back to the contact apparatus. By circulating the slurry through the saturator before the separator, nitrate precipitated as an incident of resaturation as well as nitrate precipitated in the reaction vessel is separated in a single step. Nitrate thus recovered may, for example, be washed with a saturated aqueous solution of sodium nitrate, the wash liquor being returned to the contact apparatus, and the solid nitrate reacted with sulfuric acid to generate nitric acid required either for generation of nitrogen peroxide or to make-up the aqueous nitric acid solution of chloric acid used in the generation of chlorine dioxide. Sodium sulfate or sodium bisulfate may be recovered as a by-product of such operations. However, exceptionally pure nitrates can thus be formed and they may be used for other purposes. If sulfuric acid is formed by the method of generating nitrogen peroxide used, as in the method described below, in which sulfur dioxide is reacted with nitric acid, such sulfuric acid together with associated nitric acid is used in the generation of nitric acid just mentioned. My invention thus provides a cyclic and continuous operation in which sulfuric acid, sulfur dioxide and sodium chlorate may be used to produce sodium sulfate or sodium bisulfate and chlorine dioxide substantially free from chlorine.

A generator in which the dry nitrogen peroxide can be reacted with the solution of chloric acid in aqueous nitric acid in acordance with my invention is diagrammed in Fig. 1 of the accompanying drawings. A combined operation, embodying cyclic and continuous operation, is illustrated by the flow-diagram constituting Fig. 2 of the accompanying drawings.

Fig. 1 illustrates a chlorine dioxide generator in which countercurrent contact between the reactants is achieved. The liquid mixture of chloric acid in aqueous nitric acid is introduced to the upper region of the contact tower, and the rate of flow is controlled so that a liquor level high in the tower is maintained. The nitrogen peroxide gas mixture, that is nitrogen peroxide plus diluent gas, is delivered to a lower level of the tower and the mixture bubbles upward through the acid liquor. Effectiveness of gas-liquor contact is improved by baffling as illustrated or packing. The chlorine dioxide and diluent gas is drawn from the tower top, the spent acid liquor is withdrawn from a tower level below the contact region, and the precipitated nitrate is removed from the tower bottom in form of a slurry as it accumulates.

Figure 2:
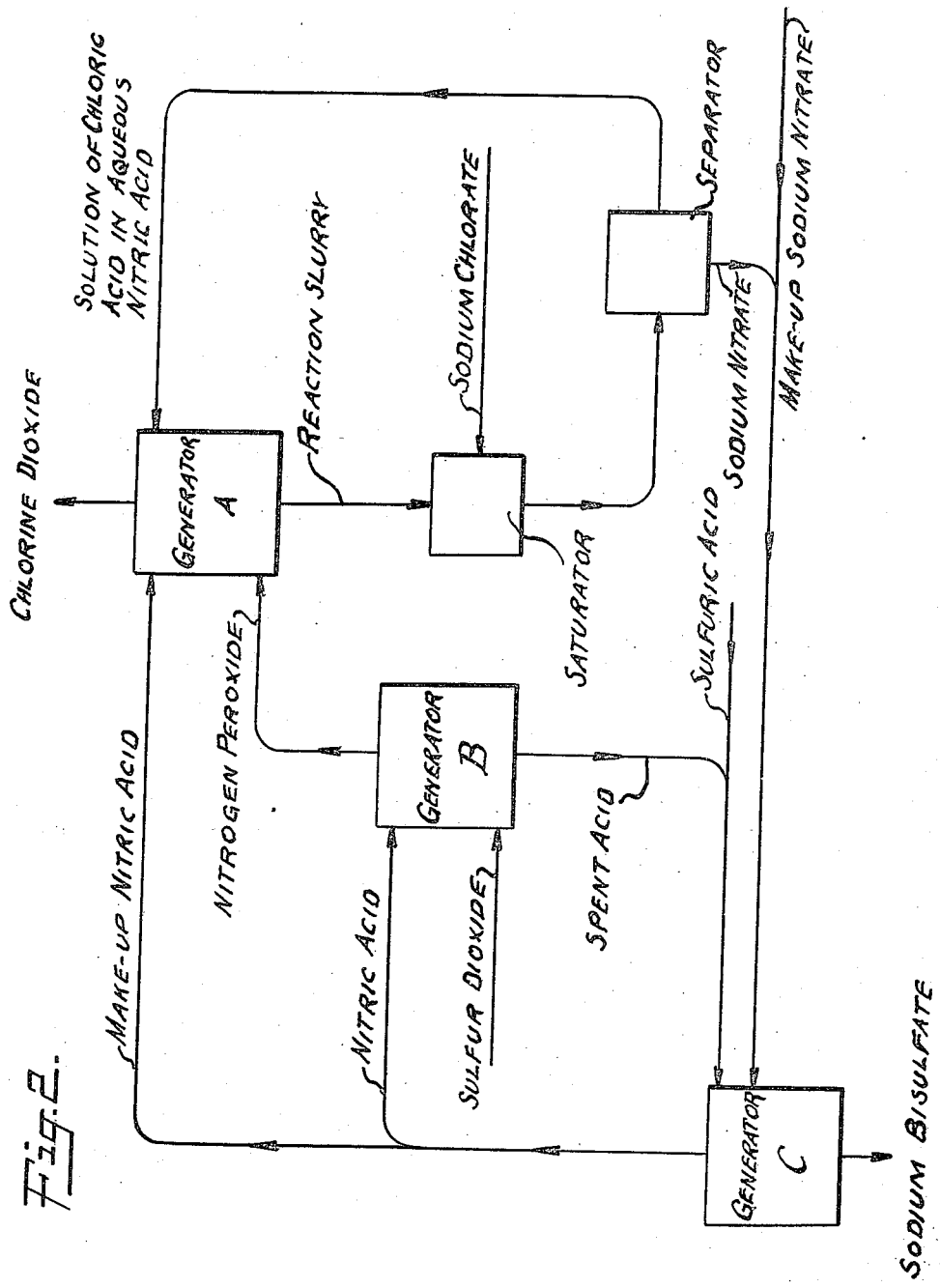

In Fig. 2, the continuous elements embodied in an exemplary flow plan may be followed. The acid liquor circulates from the chlorine dioxide generator A to the saturator into which sodium chlorate is introduced, then to the separator and thence back to generator A. Precipitated sodium nitrate is recovered in the separator and then with the necessary make-up is reacted with sulfuric acid in generator C to generate nitric acid which is delivered to generator B or to generator A with the circulating acid liquor as nitric acid make-up. Sodium bisulfate is recovered as a by-product from generator C. Sulfur dioxide is reacted with the nitric acid in generator B to generate nitrogen peroxide for delivery to generator A. The sulfuric acid formed in generator B together with associated nitric acid and make-up sulfuric acid is cycled to generator C for the generation of the nitric acid required in generators A and B.

The nitrogen peroxide reacted with the aqueous nitric acid solution of chloric acid may be generated in any convenient manner. For example, it may be generated by oxidizing ammonia to form nitrogen peroxide and then drying the product or by direct synthesis from nitrogen and oxygen by means of the Cotton crossed discharge. However, it is advantageously generated by reacting sulfur dioxide gas with concentrated aqueous nitric acid, for example at a temperature approximating 20°–35° C. The aqueous nitric acid advantageously is of 40%–72% by weight $HNO_3$ on the total of water and nitric acid concentration. The aqueous nitric acid may be of 72%–98% $HNO_3$ concentration, but the lower range just mentioned usually affords better economy. The sulfur dioxide is with advantage diluted with the same diluent gas to be used to strip chlorine dioxide from the nitrogen peroxide-aqueous nitric acid solution of chloric acid reaction mixture. For example, 40 volumes of air and 2 volumes of sulfur dioxide gas may be passed through an aqueous solution of nitric acid containing 72% $HNO_3$ to form a gas mixture comprising 40 volumes of air and 4 volumes of nitrogen peroxide.

My invention will be further illustrated by the following examples of operations embodying my invention:

Example I

A gas mixture comprising diluted nitrogen peroxide was generated by passing 40 liters of air per hour and 2 liters of sulfur dioxide per hour together through an aqueous solution of nitric acid solution containing 72% $HNO_3$. The resulting gas mixture consisted of 40 liters of air and 4 liters of nitrogen peroxide per hour. It was passed through a liquid charge in a generator consisting of a tower with a spiral passage to promote contact. The reaction temperature was 25° C. The liquid charged to the generator consisted of a mixture of equal volumes of 72% aqueous nitric acid and water saturated at 25° C. with respect to sodium chlorate and sodium nitrate. This solution contained 1.532 moles of chlorate ion. After 2 hours, 95.3% of the available chlorate was converted to chlorine dioxide. This chlorine dioxide was recovered, substantially free of chlorine and nitrogen peroxide, in admixture with the air supplied to the generator with the nitrogen peroxide.

Example II

In the same manner, a gas mixture comprising chlorine dioxide and air substantially free from chlorine and nitrogen peroxide was recovered when the same mixture of air and nitrogen peroxide described in Example I was passed, in the same type of generator, through the same liquid volume of a mixture of equal volumes of 72% aqueous nitric acid and water saturated with respect to lithium chlorate and lithium nitrate.

Example III

A gas mixture comprising diluted nitrogen peroxide, generated as described in Example I, was continuously passed through a liquid charge in the same type of generator. The liquid initially charged to the generator had the composition indicated by the analysis in the first column of the following table:

|  | Initial and resaturated liquor, per cent by weight | Removed liquor, per cent by weight |
| --- | --- | --- |
| H+ | 0.490 | 0.520 |
| $H_2O$ | 44.603 | 47.303 |
| $ClO_3^-$ | 19.251 | 15.197 |
| $NO_3^-$ | 30.365 | 32.645 |
| Na+ | 5.288 | 4.334 |

As the reaction continued, an equilibrium was reached, the liquid component of the charge then having the composition indicated by the analysis in the second column of the foregoing table. Precipitated sodium nitrate was suspended in this liquid, forming a slurry. A portion of this slurry was regularly withdrawn as the reaction continued, precipitated sodium nitrate was separated and the liquid component was resaturated with sodium chlorate, forming a liquor of approximately the same composition as the initial charge. This resaturated liquor was returned to the generator. Thus, as the reaction continued, the liquid charge in the generator was maintained of a composition intermediate that indicated by the two foregoing analyses and in general approximating that indicated by the analysis in the second column of the foregoing table. A gas mixture comprising chlorine dioxide and air substantially free from chlorine and nitrogen peroxide was continuously recovered.

I claim:

1. In the generation of chlorine dioxide, the improvement which comprises reacting dry nitrogen peroxide with a solution of chloric acid in aqueous nitric acid containing not less than 35% by weight $HNO_3$ on the total of water and nitric acid.

2. In the generation of chlorine dioxide, the improvement which comprises reacting sulfur dioxide with aqueous nitric acid containing not less than 40% by weight $HNO_3$ on the total of water and nitric acid, and reacting the nitrogen peroxide thus produced with a solution of chloric acid in aqueous nitric acid containing not less than 35% by weight $HNO_3$ on the total of water and nitric acid.

3. In the generation of chlorine dioxide, the improvement which comprises reacting sulfur dioxide with aqueous nitric acid containing not less than 40% by weight $HNO_3$ on the total of water and nitric acid and reacting the nitrogen peroxide thus produced with a solution of chloric acid in aqueous nitric acid containing not less than 35% by weight $HNO_3$ on the total of water and nitric acid, separating a solid nitrate from the reaction mixture, reacting sulfuric acid with this nitrate, and supplying the nitric acid thus produced to one of the two reactions first mentioned.

4. In the generation of chlorine dioxide, the improvement which comprises reacting dry nitrogen peroxide with a solution containing not less than 35% by weight $HNO_3$ on the total of water and nitric acid formed by dissolving sodium chlorate in aqueous nitric acid.

5. In the generation of chlorine dioxide, the improvement which comprises reacting dry nitrogen peroxide with a solution containing not less than 35% by weight $HNO_3$ on the total of water and nitric acid formed by dissolving lithium chlorate in aqueous nitric acid.

6. In the generation of chlorine dioxide, the improvement which comprises reacting dry nitrogen peroxide with a solution of chloric acid in aqueous nitric acid containing not less than 35% by weight $HNO_3$ on the total of water and nitric acid at a temperature not exceeding 50° C.

7. In the generation of chlorine dioxide, the improvement which comprises reacting dry nitrogen peroxide with a solution of chloric acid in aqueous nitric acid containing not less than 35% by weight $HNO_3$ on the total of water and nitric acid at a temperature of 15°–35° C.

JOHN F. HALLER.

No references cited.